Dec. 21, 1926.

O. B. HALEY 1,611,346

LUBRICANT METER

Filed Oct. 27, 1924

Inventor
Ora B. Haley
By Dewey, Strong, Townsend & Loftus
Attorneys

Patented Dec. 21, 1926.

1,611,346

UNITED STATES PATENT OFFICE.

ORA B. HALEY, OF SAN FRANCISCO, CALIFORNIA.

LUBRICANT METER.

Application filed October 27, 1924. Serial No. 746,091.

This invention relates to lubricant meters adapted to accurately measure the amount of lubricant passing through a pipe or conduit. Such meters are entirely automatic in operation and their use only requires that they be placed in the lubricant conducting pipe line, whereupon they function to accurately indicate the amount of lubricant passing therethrough. The primary object of my invention is to provide an improved meter for this purpose.

My invention relates particularly to a lubricant meter of the type having a rotary member in a chamber and vanes carried by the member and cooperating with the walls of the chamber to conduct the liquid therethrough as the member rotates and measure the liquid by such rotation of the member. Heretofore considerable trouble has been experienced by the seepage of lubricant from the chamber, particularly through the opening through which the driving connection from the rotary member passes. It is an object of my invention to provide an improved lubricant meter which, among other advantages, has means entirely eliminating such trouble.

Another object of the invention is to provide a lubricant meter comprising a one-piece body divided by an integral partition into two open chambers, one of such chambers being circular and having lubricant receiving means therein, and the other chamber containing means for indicating the amount of lubricant passing through the first chamber, as will hereinafter appear. Such construction is cheaper to manufacture and provides a meter improved in various respects to those heretofore used.

With the above and other objects in view, my invention consists in the features of construction and operation set forth in the following specification and illustrated in the accompanying drawing. In such drawing, annexed hereto and forming a part of this specification, I have shown certain specific embodiments of my invention, but it will be understood that the invention can be otherwise embodied and that the drawing is not to be construed as defining or limiting the scope of the invention, the claim appended to this specification being relied upon for that purpose.

Referring to the figures of the drawing.

Figure 1:
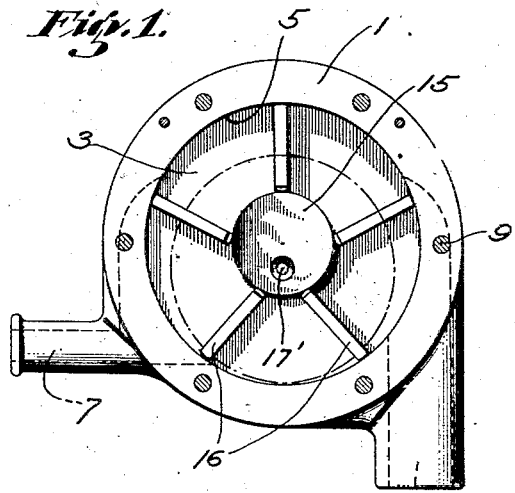
Fig. 1 is a side elevation of my improved lubricant meter with the cover plate and rotor removed.
Figure 2:
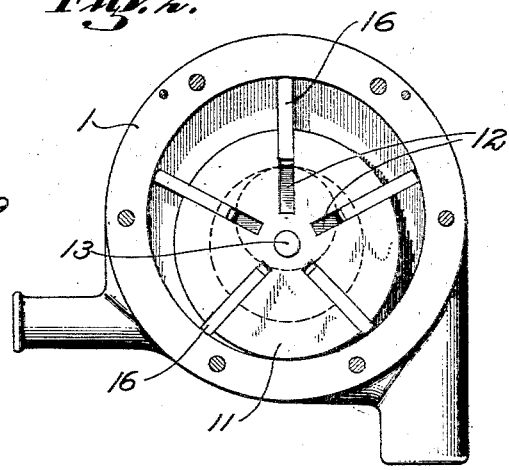
Fig. 2 is a view like Fig. 1, but showing the rotor in place.
Figure 3:
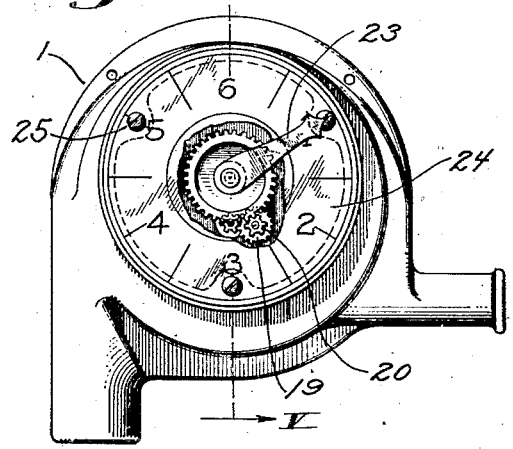
Fig. 3 is an elevation of the opposite side of the meter, the central portion of the cover plate being broken away.
Figure 4:
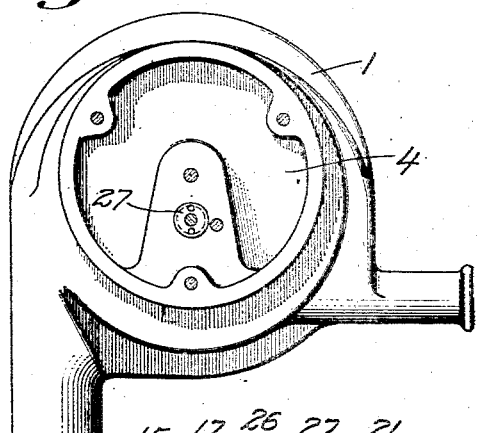
Fig. 4 is a view like Fig. 3, but showing the cover and operating parts removed.
Figure 5:
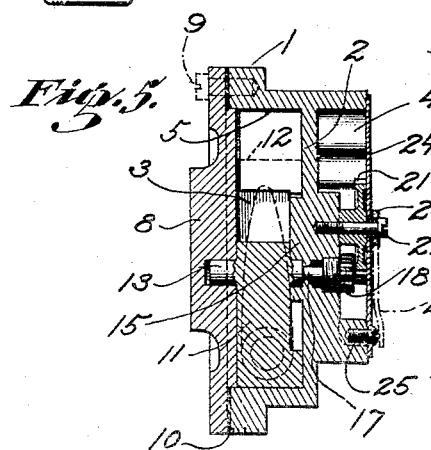
Fig. 5 is a sectional view, taken through line 5—5 of Fig. 3.
Figure 6:
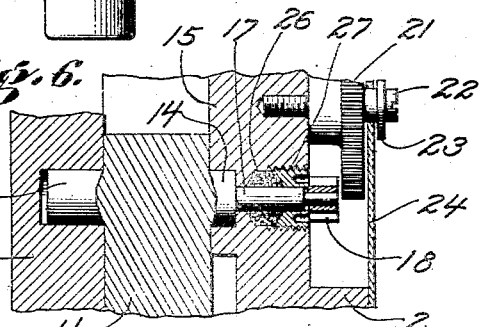
Fig. 6 is a fragmentary enlarged view of Fig. 5.

Referring more specifically to the drawing by reference characters, 1 indicates the body of my improved lubricant meter. This body, as illustrated, has a partition 2 therethrough dividing the interior into two chambers 3 and 4. The peripheral wall 5 of the chamber 3 is circular and has inlet and outlet ports 6 and 7 leading outwardly therefrom. An imperforate cover plate 8 is provided for the chamber 3. This plate is held in place by screws 9 and a packing 10 prevents any leakage of the lubricant from the chamber.

A rotary member or rotor 11 having radial slots 12 therein is rotatably mounted in the chamber 3. This member is rotatably supported on studs 13 and 14 extending respectively into the cover plate 8 and into and eccentrically of a circular block 15 on the partition 2. Flat steel plates or vanes 16 are slidably mounted in the slots 12 in a manner engaging at their inner ends against the periphery of the block 15, and at their outer ends against the peripheral wall 5 of the chamber. The construction is such that as the member 11 rotates, the block will keep the vanes in contact with the wall 5 and thereby accurately measure the lubricant passing through the chamber between the vanes, as will be understood.

A shaft 17, connected coaxially to the stud 14, extends through an opening 17' in the partition 2 and into the chamber 4. A pinion 18 on this shaft meshes with a larger pinion 19 having a smaller pinion 20 coaxially connected thereto and in mesh with a gear 21 carried on a screw 22 threaded into the partition. The gear is connected to an indicator or pointer 23 operating over a dial 24 secured to the body 1 by screws 25.

It will be obvious that the cover plate 8 fully prevents outward leakage of lubricant from the chamber 3. The only other chance for leakage is through the opening of the shaft 17. Such leakage, however, is positively prevented by a packing gland, comprising packing material 26, held tightly in place around such shaft by a bushing 27 threaded into the partition and having a conical recess in its inner end adapted to hold the packing material wedged tightly against the shaft in a manner preventing the passage of lubricant thereby.

It is believed that the construction and operation of my invention will be clear without further description. As lubricant flows through the meter, the member 11 will be rotated and a definite amount of lubricant carried from one port to the other between the vanes 16, which are held accurately in contact with the wall 5 by means of the eccentrically arranged block 15. The rotation of the member 11 is transmitted through the reduction gearing 18—21 to the indicator 23, which registers the amount of lubricant by moving over the dial 24. Obviously, the body 1 of the meter is made as a single casting and the making of the chamber 3 and its cooperating parts circular provides for very easy manufacture. The invention therefore provides a very much improved meter both from the standpoint of cheapness of manufacture and simplicity of construction and operation.

Having thus described my invention, what I claim and desire to secure by Letters Patent is—

A liquid meter comprising a circular body having a circular flat sided chamber concentrically therein and provided with tangentially arranged inlet and outlet ports, a circular shoulder concentrically arranged within and on one side only of said chamber, a circular rotary member mounted eccentrically within the chamber and provided with a plurality of radial slots, vanes mounted one in each slot for radial sliding therein, said vanes having each a projecting rounded corner bearing on said shoulder, a shaft supporting said rotary member, there being a bearing recess formed in one side wall of the chamber and a bearing opening formed through the opposite wall in which bearing recess and opening said shaft is rotatably mounted, the outer portion of said opening being widened into a packing recess with the side wall thereof screw threaded and a bushing therein threadedly engaging the threaded portion of the recess for compressing packing material around the shaft, a gear on said shaft adjacent said bushing, an indicator, and reduction gearing connecting the shaft with said indicator.

ORA B. HALEY.